US012454383B2

(12) United States Patent
Van Rijsewijk

(10) Patent No.: US 12,454,383 B2
(45) Date of Patent: Oct. 28, 2025

(54) MECHANISM AND METHOD FOR CUTTING A SLEEVE

(71) Applicant: Fuji Seal International, Inc., Osaka (JP)

(72) Inventor: Lucas Van Rijsewijk, Boxtel (NL)

(73) Assignee: Fuji Seal International, Inc., Osaka (JP)

( * ) Notice: Subject to any disclaimer, the term of this patent is extended or adjusted under 35 U.S.C. 154(b) by 0 days.

(21) Appl. No.: 18/707,022

(22) PCT Filed: Oct. 25, 2022

(86) PCT No.: PCT/IB2022/060234

§ 371 (c)(1),
(2) Date: May 2, 2024

(87) PCT Pub. No.: WO2023/079408

PCT Pub. Date: May 11, 2023

(65) Prior Publication Data

US 2024/0425220 A1 Dec. 26, 2024

(30) Foreign Application Priority Data

Nov. 4, 2021 (NL) .................................... 2029631

(51) Int. Cl.
*B65C 9/00* (2006.01)

(52) U.S. Cl.
CPC .................................. *B65C 9/0065* (2013.01)

(58) Field of Classification Search
CPC . B26D 3/16; B26D 1/28; B26D 1/285; B26D 1/305; B26D 3/164; B65C 9/0065
USPC ....................................... 83/13, 688; 53/585
See application file for complete search history.

(56) References Cited

U.S. PATENT DOCUMENTS

2004/0244559 A1* 12/2004 Huang .................. B26D 1/285 83/688
2006/0011025 A1* 1/2006 Chen ........................ B26D 3/16 83/13

FOREIGN PATENT DOCUMENTS

DE 29810029 U1 9/1998
ES 283804 U 5/1985
WO WO 2000/027600 A1 5/2000
WO WO-0027600 A1 * 5/2000 ............... B26D 5/06

OTHER PUBLICATIONS

International Search Report and Written Opinion dated Jan. 25, 2023, for International Application No. PCT/IB2022/060234, 7 pages.

* cited by examiner

*Primary Examiner* — Jacob A Smith
(74) *Attorney, Agent, or Firm* — Frost Brown Todd LLP

(57) ABSTRACT

A sleeve cutting mechanism (5; 105; 205; 305) for cutting a sleeve (3) being conveyed along a sleeve conveyance axis through a labelling machine (1) comprises a basis (10) with a sleeve passage extending along a central axis (7) which coincides with the sleeve conveyance axis, a plurality of rotary cutters (12, 12*a* to 12*f*) which are held on the basis (10) at a radial distance to and at angular distances around the central axis (7) of the sleeve passage. Each of the rotary cutters (12, 12*a* to 12*f*) comprises a carrier (14) which is held rotatably around an axis of rotation parallel to the central axis (7) of the basis (10), and at least one blade (16) fixed to the carrier for cutting the sleeve (3). Radial distances of the rotary cutters (12, 12*a* to 12*f*) with respect to the central axis (7) of the sleeve passage are adjustable.

19 Claims, 6 Drawing Sheets

MECHANISM AND METHOD FOR CUTTING A SLEEVE

TECHNICAL FIELD

The present invention relates to a sleeve cutting mechanism for cutting a sleeve being conveyed along a sleeve conveyance axis through a labeling machine and a method for cutting a sleeve.

BACKGROUND ART

Sleeve cutting mechanisms for cutting shrinkable tubular sleeves are well known in the art. Those shrinkable sleeve foils are made of heat-shrinkable material that is caused to shrink when its temperature is increased and thereby getting firmly attached to a product, such as containers (food containers, bottles, jars, bowls, holders etc.). Such sleeve cutting mechanisms are part of a labelling machine through which a sleeve is being conveyed along a sleeve conveyance axis. In particular, the flat sleeve is guided over a mandrel which opens the sleeve and creates a cross-section, in particular a circular cross-section, that substantially matches the shape of the product. In general, the sleeve cutting mechanism comprises a plurality of rotary cutters arranged circularly around the sleeve conveyance axis. Each rotary cutter has a blade rotating 3600 around its rotation axis when cutting the sleeve.

Document TWM 283804 U discloses a sleeve cutting mechanism for cutting tubular sleeves. The sleeve cutting mechanism comprises a plurality of rotary cutters in the form of gears which are arranged inside and mesh with a ring gear for driving the cutters. The rotary cutters and the ring gear are each rotatable around their central axis. One of the rotary cutters is driven by a timing belt such that said rotary cutter rotates around its longitudinal axis and drives the other rotary cutters via the ring gear. Each rotary cutter comprises a blade fixed to the rotary cutter rotating 360° around its rotation axis when cutting the sleeve.

In the sleeve cutting mechanism of TWM 283804 U, the radial positions of the rotary cutters with respect to the central axis of the ring gear are fixed. Thus, the radial distances of the cutting blades fixed to the rotary cutters with respect to the central axis of the ring gear are fixed which severely limits the range of sleeve sizes the sleeve cutting mechanism is able to cut.

SUMMARY OF THE INVENTION

Since there is a general requirement for the shrinkable sleeves to match the outer shape of the product (food containers, bottles, jars, bowls, holders etc.) the shrinkable sleeve is put onto as good as possible in order to achieve good shrink results and since the products vary in size, there is a basic need for cutting sleeves of different sizes. In particular, the size of a tubular sleeve can be defined by a lay flat width which corresponds to a horizontal width of the sleeve in state before it is opened by the mandrel.

Starting from the sleeve cutting mechanism disclosed in TWM 283804 U, it is an object of the invention to provide a sleeve cutting mechanism being able to cut sleeves having different sizes, i.e. sleeves having different lay flat widths, and a method for cutting a sleeve. The object is achieved by the subject-matter of the independent claims. Advantageous further developments are laid out in the dependent claims. According to the present invention, a sleeve cutting mechanism for cutting a sleeve being conveyed along a sleeve conveyance axis through a labeling machine, comprises a basis with a sleeve passage extending along a central axis which coincides with the sleeve conveyance axis, a plurality of rotary cutters which are held on the basis at a radial distance to and at angular distances around the central axis of the sleeve passage, and each of which comprises a carrier which is held rotatably around an axis of rotation parallel to the central axis of the basis, and at least one blade fixed to the carrier for cutting the sleeve. Radial distances of the rotary cutters with respect to the central axis of the sleeve passage are adjustable.

According to the invention, radial distances of the rotary cutters with respect to the central axis of the sleeve passage are adjustable. Therefore, the sleeve cutting mechanism is able to cut sleeves having different sizes, i.e. sleeves having different lay flat widths. In this way, an in particular shrinkable sleeve adapted to the shape of a product can be produced easily and quickly for products of different sizes without having to retool the sleeve cutting mechanism by, for example, mounting rotary cutters or blades having different sizes or lengths. Further, with the sleeve cutting mechanism according to the invention, handling and operability is improved.

The sleeve being cut by the sleeve cutting mechanism in particular is a tubular shrinkable sleeve. However, the sleeve may also be non-shrinkable and the shape of the sleeve does not have to be tubular as long as the sleeve is able to be conveyed along the sleeve conveyance axis and be cut by the rotary cutters of which the radial distances with respect to the central axis of the sleeve passage are adjustable. Further, the sleeve may be, for example, a stretch film. In a preferred embodiment the sleeve is opened by a mandrel which is disposed in the sleeve passage. In other words, the mandrel opens the cross-section of the sleeve perpendicular to the sleeve conveyance axis such that it matches the shape of the product the sleeve is put onto after it is cut.

The sleeve is conveyed through the sleeve cutting mechanism along the above mentioned sleeve conveyance axis in a state where—at least in the open state of the sleeve—a longitudinal center line of the sleeve (i.e., a sleeve longitudinal axis) coincides with the sleeve conveyance axis of the sleeve cutting mechanism and the central axis of the basis.

In the preferred embodiment the basis is annularly formed having an opening through which the sleeve passage is passing.

In a preferred embodiment, each carrier comprises one blade. During a cutting operation, each carrier or each blade fixed to the carrier rotates 3600 around its axis of rotation parallel to the central axis of the sleeve passage. In alternative embodiments, each carrier may comprise two or more blades. In this case, during a cutting operation, each carrier or each blade fixed to the carrier rotates by an angle of at least 360° divided by the number of blades.

In a preferred embodiment the rotary cutters are held on the basis so as to be movable in a common plane having a normal vector which corresponds to the central axis. In such a way, the radial distances of the rotary cutters with respect to the central axis of the sleeve passage are easily adjustable. As the rotary cutters are movable in a common plane having a normal vector which corresponds to the central axis of the basis, the rotary cutters can be precisely positioned without changing a vertical height with respect to each other and with respect to the basis.

The radial distances of the rotary cutters may be synchronously adjustable. In particular, if the cross-section of the sleeve to be cut is circular, excellent cutting results can be achieved compared to a sleeve cutting mechanism in which radial distances of the rotary cutters are individually adjustable. However, if the cross-section of the sleeve to be cut differs from a circular cross-section, rotary cutters which are individually adjustable may be preferable.

The rotary cutters may be divided into at least two groups, wherein the radial distances of the rotary cutters assigned to any one of the at least two groups are adjustable synchronously and independently of the radial distances of the rotary cutters assigned to another of the at least two groups. For example, if the cross-section of the sleeve to be cut is oval, the radial distances of the rotary cutters to be adjusted differ from each other. As such, in the above configuration, the radial distances of the rotary cutters of each group with respect to the central axis of the sleeve passage may be adjusted synchronously but independently of the radial distances of the rotary cutters assigned to another of the at least two groups in order to be able to cut a sleeve having an oval cross-section.

The rotary cutters may be each rotatably mounted to one end portion of a pivoting arm which is mounted to the basis so as to be pivotable about a respective pivoting axis. In such a case, the radial distance of a rotary cutter with respect to the central axis of the sleeve passage is easily adjustable by pivoting the pivoting arm about its pivoting axis.

The pivoting arm may engage at its other end portion opposite to the one end portion, with a pivoting drive mechanism. The pivoting drive mechanism may be any mechanism able to pivot the pivoting arm in order to adjust the radial distance of the rotary cutter with respect to the central axis of the sleeve passage. In a preferred embodiment, the pivoting drive mechanism synchronously drives pivoting arms of at least two rotary cutters or pivoting arms assigned to a group of rotary cutters.

The pivoting drive mechanism may comprise a ring gear which is held on the basis so as to be rotatable around the central axis of the sleeve passage, and which meshes with gear means provided at the other end portion of the respective pivoting arm. With this configuration, by rotating the ring gear, the radial distances of the rotary cutters with respect to the central axis of the sleeve passage can be adjusted easily and synchronously. In a preferred embodiment, the gear means is a gear segment or toothed segment non-rotatably connected to the pivoting arm and held on the basis.

Alternatively, the gear means may be a gear.

The ring gear may be rotatable by means of a crank handle mechanism mounted to the basis. A crank handle mechanism provides a simple and inexpensive drive means for the ring gear. As an alternative, the ring gear may be rotatable by means of a motor, in particular, an electric motor or the like.

The pivoting drive mechanism may comprise at least two ring gears which are held one on top of the other on the basis, so as to be rotatable around the central axis of the sleeve passage independently of each other, and which mesh with gear means provided at the other end portion of an associated rotary cutter or of associated rotary cutters. Such a structure is particularly advantageous if the radial distances of the rotary cutters with respect to the central axis of the sleeve passage have to be adjusted radially by different distances. This is the case, for example, if the cross-section of the sleeve perpendicular to the sleeve conveyance axis is oval, so that rotary cutters which have to be radially adjusted by the same distance may be assigned to a same ring gear, respectively. Thus, a simple and precise radial adjustment can be achieved.

The pivoting drive mechanism may comprise at least two ring gear segments which are held on the basis one on top of the other or adjacent to each other, so as to be rotatable around the central axis of the sleeve passage independently of each other, and which mesh with gear means provided at the other end portion of an associated rotary cutter or of associated rotary cutters. Specifically, if the ring gear segments are held on the basis adjacent to each other, a structure which is highly space-saving can be achieved.

The ring gears or ring gear segments may each be rotatable by means of associated crank handle mechanisms mounted to the basis. A crank handle mechanism provides a simple and inexpensive drive means for the ring gear or ring gear segments. As an alternative, the ring gear or ring gear segments may be rotatable by means of a motor, in particular, an electric motor or the like.

Each rotary cutter may comprise a driven gear or driven pulley non-rotatably connected to the respective carrier. As such, a rotary drive force can be easily transmitted to the carrier and the at least one blade fixed to the carrier for cutting the sleeve.

If the rotary cutter comprises a driven pulley, the driven pulley may be driven by a timing belt. Such a design does not require a large number of gears and is therefore inexpensive and simple in construction. Further, compared to a structure comprising a large number of (driven) gears, such a design has less inertia.

If the rotary cutter comprises a driven gear, the driven gear may be driven by an intermediate gear which is held rotatably on the pivoting arm, with an axis of rotation coinciding with the pivoting axis. Due to the gear connection between the intermediate gear and the driven gear, a rotational force can be reliably transmitted to the driven gear and the carrier having the blade fixed thereto. Therefore, excellent cutting results can be achieved.

The sleeve cutting mechanism may comprise a ring gear meshing with the intermediate gears, which is held on the basis so as to be rotatable around the central axis. Similarly to the ring gear for adjusting the radial distances of the rotary cutters with respect to the central axis of the sleeve passage, by rotating the ring gear meshing with the intermediate gears, the ring gear is able to synchronously transmit a rotational force to the intermediate gears meshing with the carrier. The ring gear may be driven by a motor, in particular an electric motor.

A method for cutting a sleeve using a sleeve cutting mechanism according to the invention comprises the steps moving the rotary cutters with respect to the central axis of the sleeve passage to adjust radial distances of the rotary cutters depending on a cross-section of a tubular sleeve being conveyed though a sleeve passage on an mandrel, so that at least one blade fixed to a carrier when rotating around its axis of rotation can enter into the sleeve passage, and rotating each carrier by an angle of at least 360° divided by the number of blades.

SHORT DESCRIPTION OF THE FIGURES

Embodiments of the invention are described in more detail in the following with the help of the appended figures, wherein.

Figure 1:
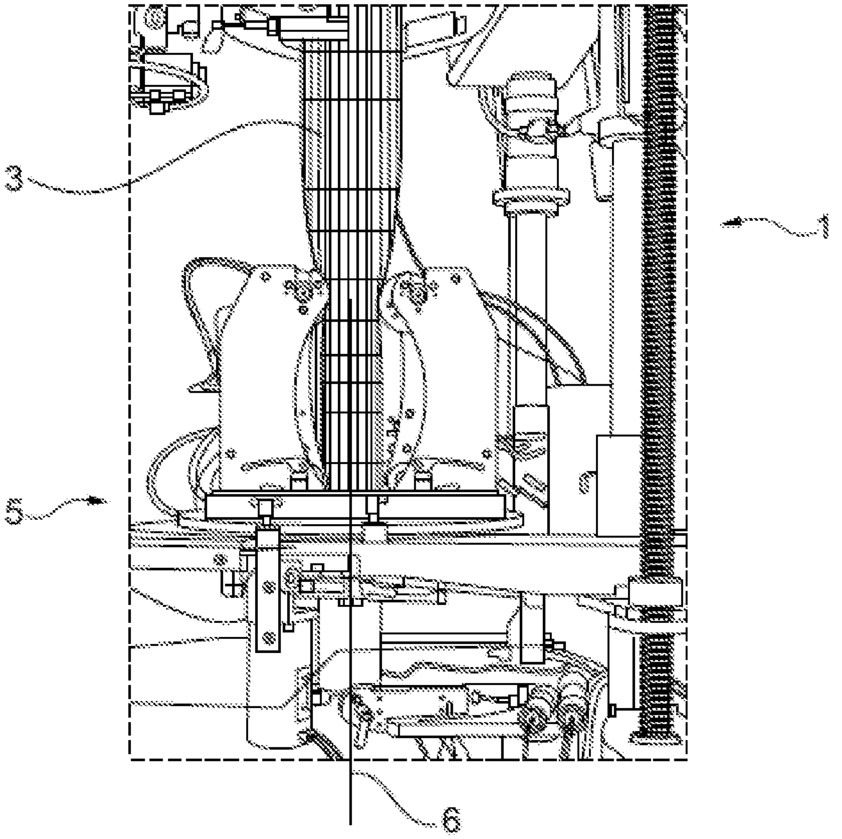
FIG. 1 shows a perspective view of a labelling machine comprising a sleeve cutting mechanism of a first embodiment according to the invention.
Figure 2:
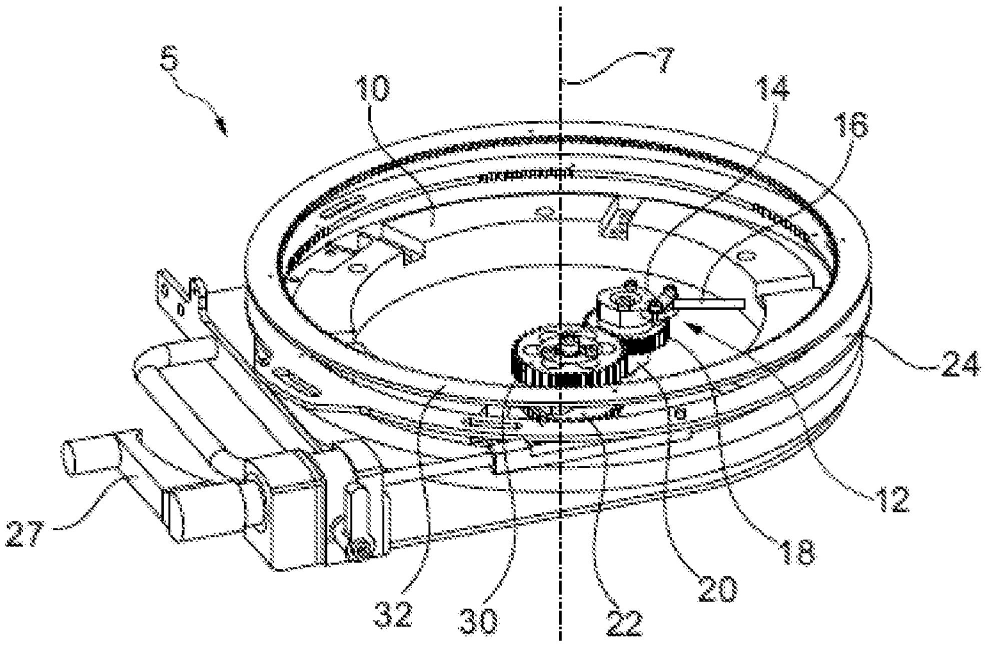
FIG. 2 shows a perspective view of the sleeve cutting mechanism of the first embodiment of the invention wherein only one rotary cutter is illustrated.
Figure 3:
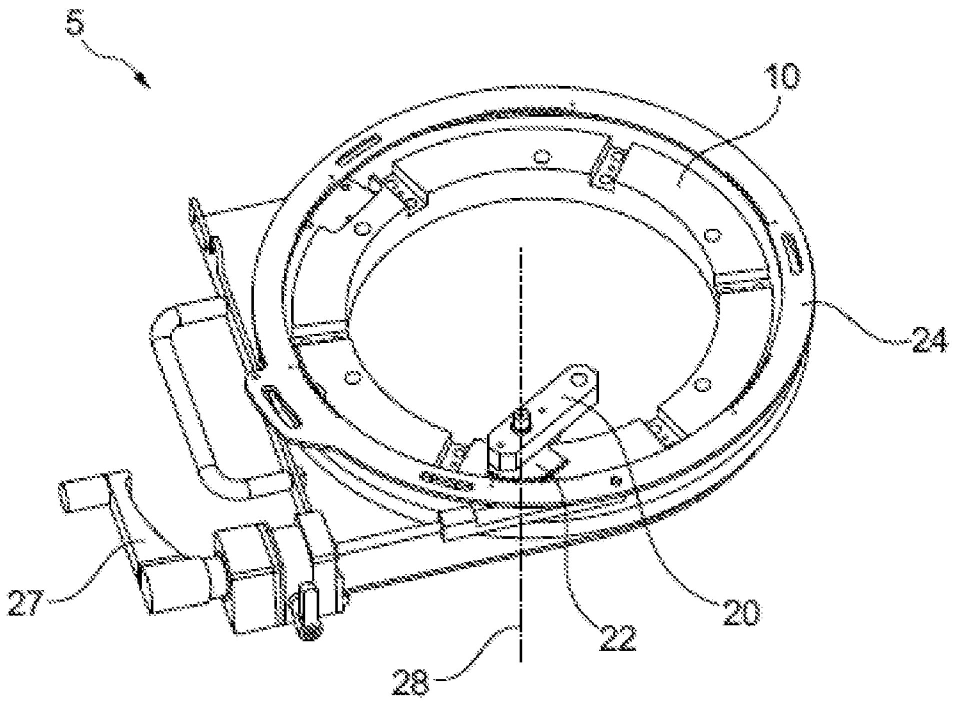
FIG. 3 shows another perspective view of the sleeve cutting mechanism of the first embodiment of the invention illustrating a pivoting arm and a ring gear segment.
Figure 4:
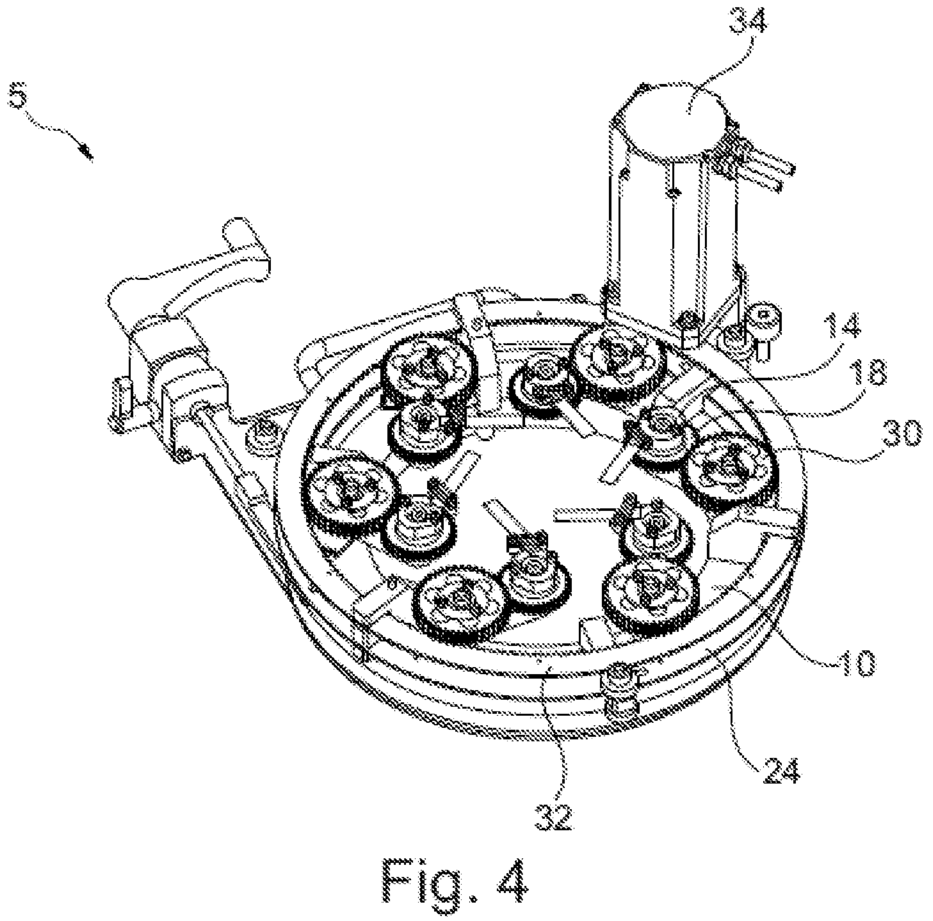
FIG. 4 shows another perspective view of the sleeve cutting mechanism of the first embodiment of the invention having six rotary cutters.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it should be understood, however, that this invention is not limited to the precise arrangements shown.

DETAILED DESCRIPTION OF EMBODIMENTS

The following description of embodiments of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive. Various suitable ways in which the teachings herein may be combined will be readily apparent to those of ordinary skill in the art in view of the teachings herein. Such modifications and variations are intended to be included within the scope of the claims.

First Embodiment

FIGS. 1 to 6 show different views of a labelling machine 1 and a sleeve cutting mechanism 5 of a first embodiment according to the invention. For illustration reasons, not all elements of the sleeve cutting mechanism 5 are shown in some cases in FIGS. 1 to 6.

Referring to FIG. 1, a labelling machine 1 is shown thorough which a shrinkable tubular sleeve 3 is being conveyed along a sleeve conveyance axis which extends in a vertical direction in FIG. 1. In particular, the flat sleeve 3 is guided over a mandrel (not shown) which opens the sleeve 3 and creates a circular cross-section that substantially matches the shape of a product the sleeve 3 is put onto after it is cut. FIG. 1 further discloses a sleeve cutting mechanism 5 that actually cuts the sleeve 3 in a plane of which the normal vector corresponds to the sleeve conveyance axis. The sleeve 3 is conveyed through the sleeve cutting mechanism 5 along the above mentioned sleeve conveyance axis in a state where—at least in the open state of the sleeve 3—a longitudinal center line 6 of the sleeve 3 (i.e., a sleeve longitudinal axis) coincides with the sleeve conveyance axis of the sleeve cutting mechanism and the central axis of the basis.

FIGS. 2 to 6 each show the sleeve cutting mechanism 5 in more detail. The sleeve cutting mechanism 5 comprises an annular basis 10 with a sleeve passage extending along a central axis 7 which coincides with the sleeve conveyance axis. In the first embodiment, the sleeve cutting mechanism 5 includes six rotary cutters 12. Each rotary cutter 12 includes a carrier 14 which is held rotatably around an axis of rotation parallel to the central axis 7 of the basis 10, one blade 16 for cutting the sleeve detachably fixed to the carrier 14 and a driven gear 18 which is non-rotatably connected to the carrier 14. The rotary cutters 12 are each rotatably mounted to one end portion of a pivoting arm 20 which is mounted to the basis 10 so as to be pivotable about a respective pivoting axis 28. By rotating around its rotation axis, the driven gear 18 and the carrier 14 having the blade 16 fixed thereto can cut the sleeve 3 being conveyed along the sleeve conveyance axis. As can be best seen in FIG. 2, the pivoting arm 20 engages at its other end portion opposite to the one end portion, with a pivoting drive mechanism in the form of a ring gear 24 which is held on the basis 10 so as to be rotatable around the central axis 7 of the sleeve passage. In particular, the pivoting arm 20 is non-rotatably fixed to a gear means in the form of a gear segment 22 comprising a plurality of teeth meshing with teeth formed at an inner circumference of the ring gear 24.

The ring gear 24 is rotatable by means of a crank handle 27. When operating the crank handle 27, the ring gear 24 rotates around the central axis 7. Due to the meshing with the gear segment 22, the pivoting arm 20 pivots around a pivoting axis 28 which is parallel to the central axis 7 of the basis 10. Accordingly, the radial distances of the rotary cutters 12, each of which comprises the driven gear 18, the carrier 14 and the blade 16 fixed to the carrier 14, with respect to the central axis 7 of the sleeve passage are synchronously adjustable. Specifically, the rotary cutters 12 are held on the basis 10 so as to be movable in a common plane having a normal vector which corresponds to the central axis 7. As the rotary cutters 12 are movable or rather adjustable in a common plane, the rotary cutters 12 can be precisely positioned without changing a vertical height. Thus, as a height difference of the blades 16 can be kept to an absolute minimum, and so-called "pig tails" which are sleeve material residues which remain at a cutting edge of the sleeve 3 after it is cut can be prevented reliably.

As shown in FIGS. 2 and 4 to 6, the driven gear 18 is driven by an intermediate gear 30 which is held rotatably on the pivoting arm 20 with an axis of rotation coinciding with the pivoting axis 28. As the axis of rotation of the intermediate gear 30 coincides with the pivoting axis 28, the intermediate gear 30 does not change its radial position with respect to the central axis 7 when the radial distances of the rotary cutters 12 with respect to the central axis 7 of the sleeve passage are adjusted. Similarly to the gear segments 22, the intermediate gears 30 are driven by a ring gear 32 which is held on the basis 10 so as to be rotatable around the central axis 7. For this purpose, the ring gear 32 comprises teeth along its whole inner circumference meshing with all of the six intermediate gears 30. The ring gear 32 is driven by an electric motor 34 via one of the six intermediate gears 30 (cf. FIG. 4).

Owing to the structure as described above, the sleeve cutting mechanism 5 is able to cut sleeves 3 having different sizes, i.e. sleeves 3 having different lay flat widths. Specifically, the sleeve cutting mechanism is able to cut sleeves 3 having lay flat widths in a range from 58 mm to 226 mm without having to retool the sleeve cutting mechanism 5 by, for example, mounting rotary cutters or blades having different sizes or lengths. Further, as the ring gear 24 synchronously adjusts the radial distances of all of the six rotary cutters 12, the sleeve cutting mechanism 5 is particularly suitable for cutting sleeves 3 having a circular or round cross-section. It is to be noted that the radial distances of the rotary cutters 12 with respect to the central axis 7 should be adjusted such that the tips of the blades 16 enter the sleeve 3 first when the carriers 14 are rotating by an angle of 360° around their rotation axis when cutting the sleeve 3. Otherwise, the blades 16 can not enter the sleeve 3 reliably.

Figure 5:
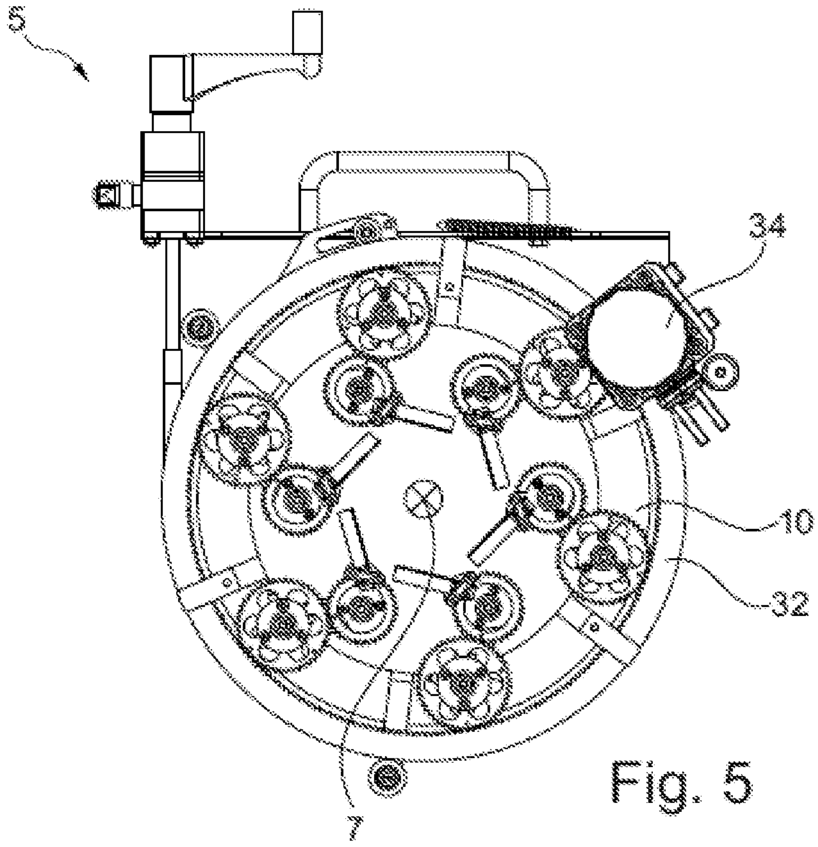
FIG. 5 shows a top view of the sleeve cutting mechanism of the first embodiment of the invention wherein the rotary cutters are positioned in an innermost position.
Figure 6:
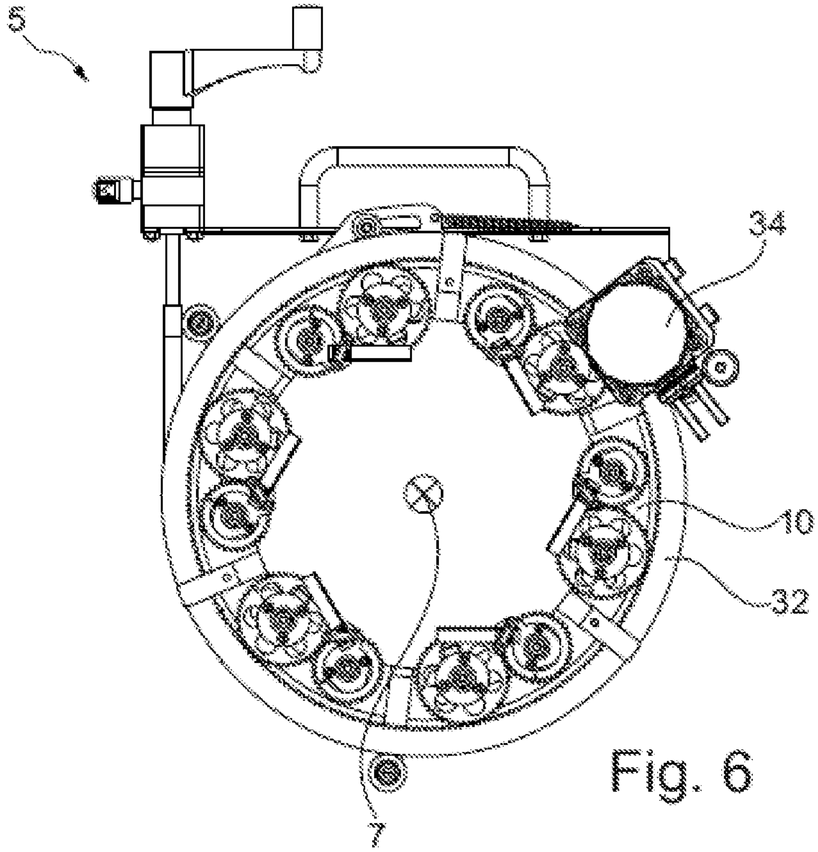
FIG. 6 shows a top view of the sleeve cutting mechanism of the first embodiment of the invention wherein the rotary cutters are positioned in an outermost position.

FIG. 5 shows a top view of the sleeve cutting mechanism 5 in which the rotary cutters 12 are positioned in an innermost position with respect to the central axis 7 of the sleeve passage. In contrast, FIG. 6 shows a top view of the sleeve cutting mechanism 5, in which the rotary cutters 12 are positioned in an outermost position with respect to the central axis 7 of the sleeve passage. It is noted that the central axis 7 extends perpendicular to a drawing plane in FIGS. 5 and 6.

Second Embodiment

Figure 7:
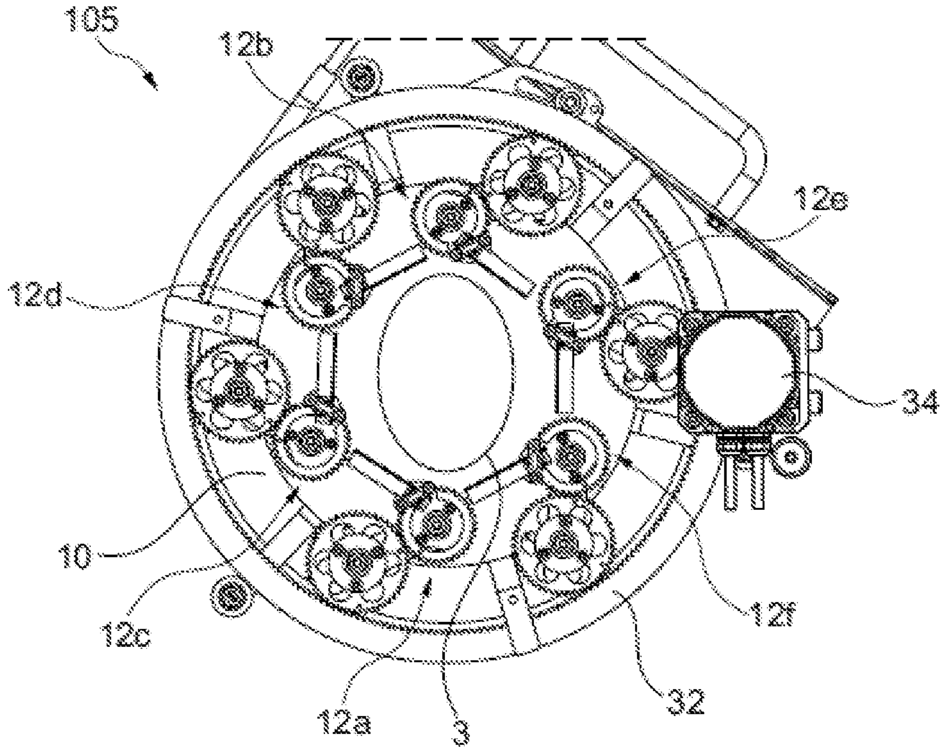
FIG. 7 shows a top view of a sleeve cutting mechanism of a second embodiment of the invention for cutting oval shaped sleeves.
Figure 8:
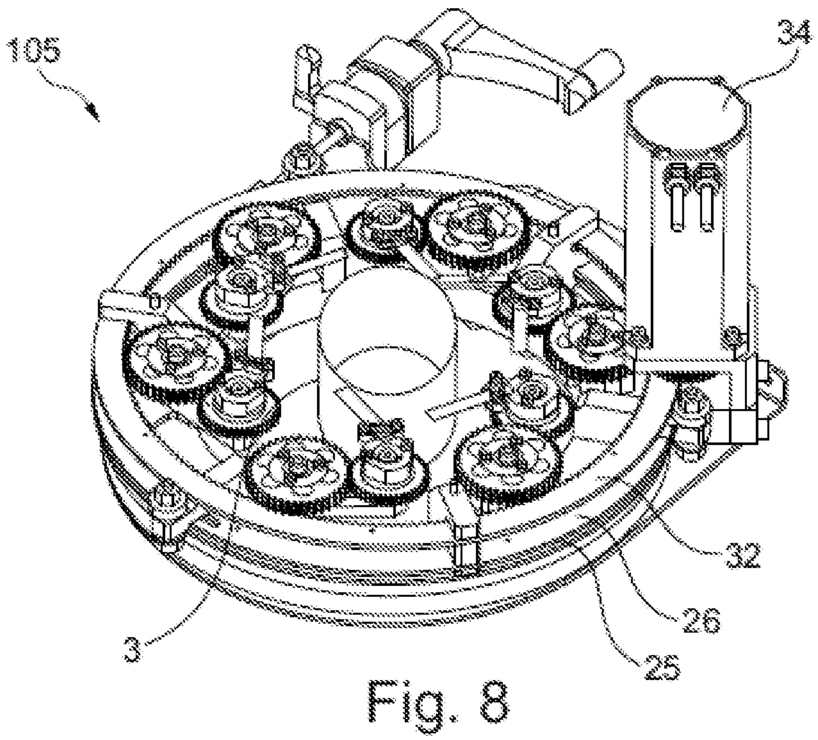
FIG. 8 shows a perspective view of the sleeve cutting mechanism of the second embodiment of the invention for cutting oval shaped sleeves.

FIGS. 7 and 8 show a sleeve cutting mechanism 105 of a second embodiment according to the invention. The sleeve cutting mechanism 105 differs from the sleeve cutting mechanism 5 of the first embodiment in that it comprises two ring gears 25, 26 instead of one ring gear 24 for adjusting the radial positions of the rotary cutters 12. Each ring gear 25, 26 is held on the basis 10 so as to be rotatable around the central axis 7 of the sleeve passage.

In the second embodiment, the rotary cutters 12 are divided into two groups. As shown in FIG. 7, the sleeve cutting mechanism 105 comprises two rotary cutters 12*a*, 12*b* assigned to a first group and four rotary cutters 12*c*, 12*d*, 12*e*, 12*f* assigned to a second group. The radial distances of the rotary cutters 12*a*, 12*b* assigned to the first group with respect to the central axis 7 of the sleeve passage can be adjusted synchronously and independently of the radial distances of the rotary cutters 12*c*, 12*d*, 12*e*, 12*f* assigned to the second group. Specifically, the radial distances of the rotary cutters 12*a*, 12*b* can be adjusted by rotating the ring gear 25, and the radial distances of the rotary cutters 12*c*, 12*d*, 12*e*, 12*f* can be adjusted by rotating the ring gear 26. For this purpose, the ring gear 25 comprises teeth formed on its inner circumference only at portions at which the ring gear segments 22 non-rotatably connected to the pivoting arms 20 of the rotary cutters 12*a*, 12*b* are located. Similarly, the ring gear 26 comprises teeth formed on its inner circumference only at portions at which the ring gear segments 22 non-rotatably connected to the pivoting arms 20 of the rotary cutters 12*c*, 12*d*, 12*e*, 12*f* are located. That is, the radial distances of the rotary cutters 12*a*, 12*b* the radial distances assigned to the first group can be adjusted independently of the radial distances of the rotary cutters 12*c*, 12*d*, 12*e*, 12*f* assigned to the second group.

When cutting sleeves the cross-section or the outer contour of which differ from a circular or round shape, the radial distances of the rotary cutters with respect to the central axis 7 of the sleeve passage to be adjusted also differ from each other. As shown in FIGS. 7 and 8, the cross-section or the outer contour of the sleeve 3 to be cut is oval. As the sleeve cutting mechanism 105 is able to adjust the radial distances of the rotary cutters 12*a*, 12*b* synchronously and independently of the radial distances of the rotary cutters 12*c*, 12*d*, 12*e*, 12*f*, the sleeve cutting mechanism 105 is able to cut the sleeve 3 having an oval cross-section.

It is a general requirement for the shrinkable sleeves 3 to match the outer shape of a product (food containers, bottles, jars, bowls, holders etc.) the sleeve 3 is put onto as good as possible in order to achieve good shrink results. Owing to the structure as described above, the sleeve cutting mechanism 105 of the second embodiment is able to cut sleeves the cross-section of which differs from a circular or round shape, e.g. sleeves having an oval cross-section. Thus, the sleeve cutting mechanism 105 can be used to cut shrinkable sleeves 3 the outer shape of which matches particularly well with the outer shape of a product that is not circular or round, e.g. oval. Therefore, sleeves for products of almost any shape can be cut and excellent shrink results can be achieved.

Third Embodiment

Figure 9:
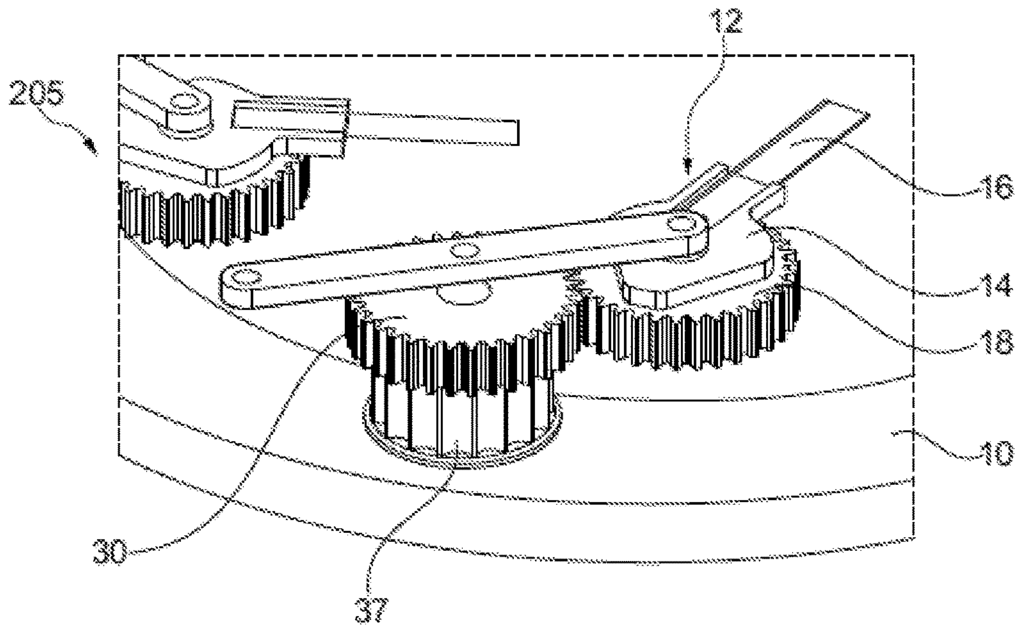
FIG. 9 shows a schematic part view of a sleeve cutting mechanism of a third embodiment of the invention having a pulley.
Figure 10:
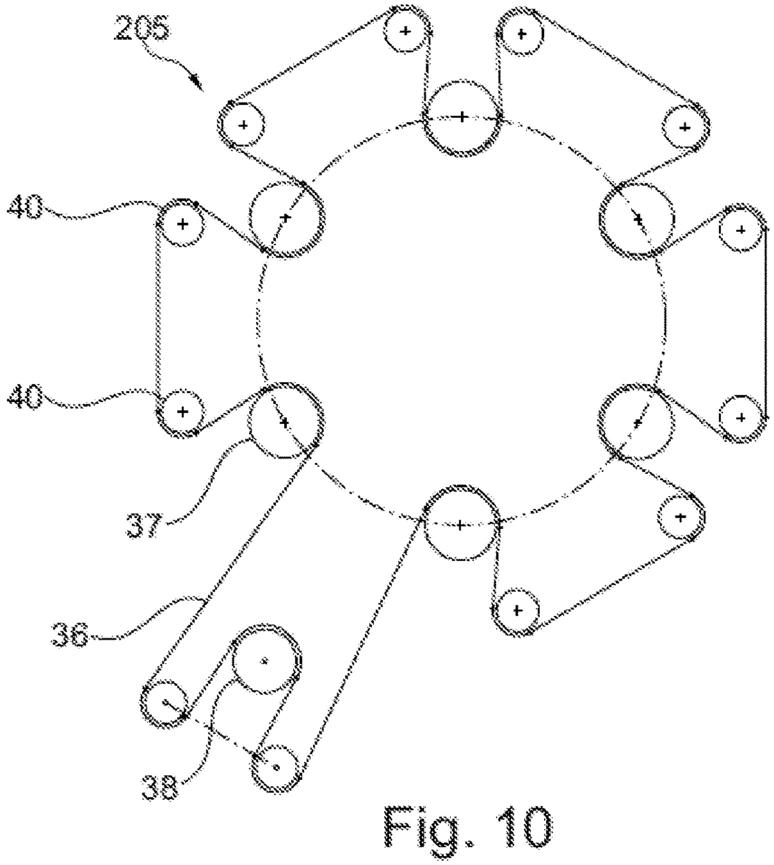
FIG. 10 shows a schematic top view of the sleeve cutting mechanism of the third embodiment of the invention.

FIGS. 9 and 10 show a sleeve cutting mechanism 205 of a third embodiment according to the invention. The sleeve cutting mechanism 205 differs from the sleeve cutting mechanism 5 of the first embodiment in that the intermediate gear 30 is driven by a timing belt 36 wound around a pulley 37 which is held on the basis 10 so as to be rotatable and which is non-rotatably fixed to the intermediate gear 30.

As shown in the schematic top view of the sleeve cutting mechanism 205 in FIG. 10, a plurality of rollers 40 are provided to make sure sufficient teeth of the timing belt 36 and the pulley 37 mesh with each other. A motor 38 provides power for driving the timing belt 36.

Fourth Embodiment

Figure 11:
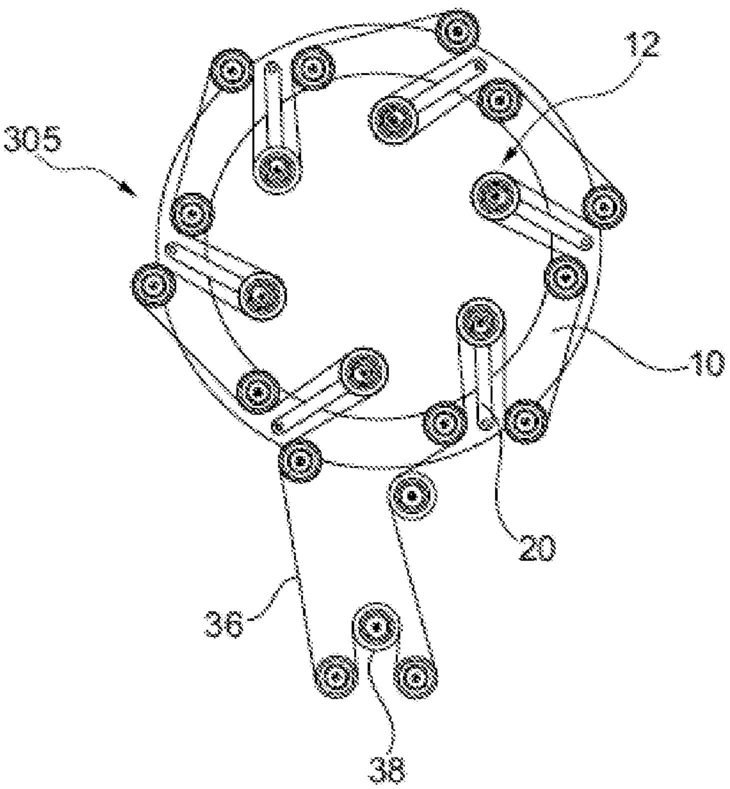
FIG. 11 shows a schematic top view of a sleeve cutting mechanism of a fourth embodiment of the invention having no gears.
Figure 12:
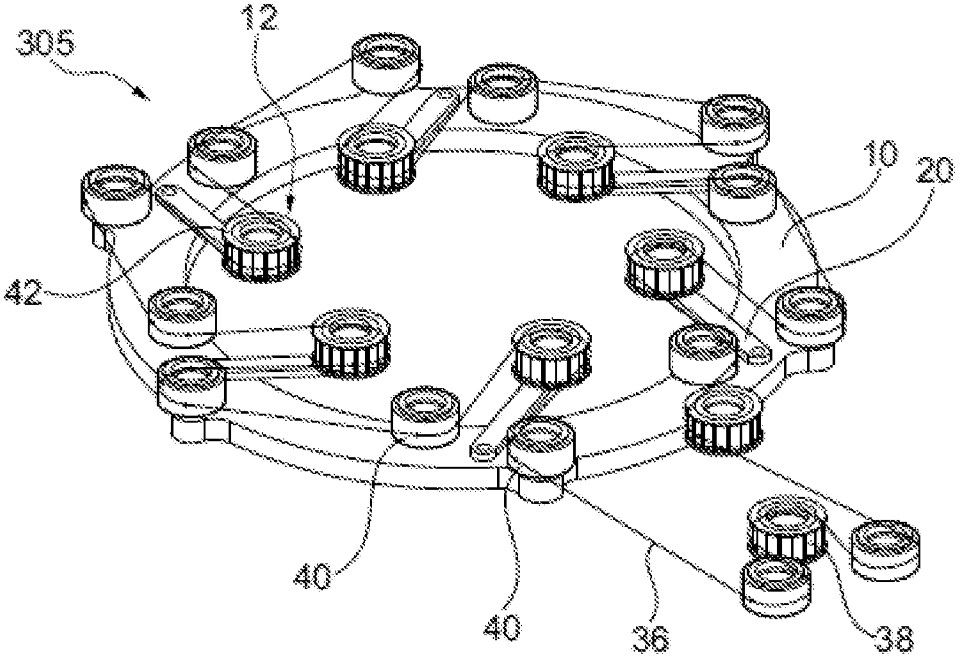
FIG. 12 shows a schematic perspective view of the sleeve cutting mechanism of the fourth embodiment of the invention.

FIGS. 11 and 12 show a sleeve cutting mechanism 305 of a fourth embodiment according to the invention. The sleeve cutting mechanism 305 differs from the sleeve cutting mechanism 5 of the first embodiment in that it does not comprise any gears. In particular, the rotary cutter 12 of the sleeve cutting mechanism 305 comprises a driven pulley 42 instead of a driven gear and an intermediate gear. The pulley 42 is driven by the timing belt 36 wound around the pulley 42 and the rollers 40, wherein the timing belt 36 is driven by the motor 38. It is noted that, for illustration reasons, FIGS. 11 and 12 do not disclose the carriers 14, the blades 16 or the ring gear segments 22 for adjusting the radial distances of the rotary cutters 12 with respect to the central axis 7 of the sleeve passage.

The sleeve cutting mechanism 305 of the fourth embodiment has less parts and is less costly compared to embodiments having gears, e.g. driven gears and intermediate gears. Further, the sleeve cutting mechanism 305 has less inertia and can be build lower and is therefore more compact in size.

REFERENCE SIGNS

1 labelling machine
3 sleeve

5, 105, 205, 305 sleeve cutting mechanism
6 longitudinal center line
7 central axis
10 basis
12 rotary cutter
12*a* to 12*f* rotary cutter
14 carrier
16 blade
18 driven gear
20 pivoting arm
22 ring gear segment
24 ring gear
25 ring gear
26 ring gear
27 crank handle
28 pivoting axis
30 intermediate gear
32 ring gear
34 electric motor
36 timing belt
37 pulley
38 motor
40 roller
42 driven pulley

The invention claimed is:

1. Sleeve cutting mechanism for cutting a sleeve being conveyed along a sleeve conveyance axis through a labelling machine, comprising:
- a basis with a sleeve passage extending along a central axis which coincides with the sleeve conveyance axis;
- a plurality of pivoting arms which are held on the basis;
- a plurality of rotary cutters which are held on the basis at a radial distance to and at angular distances around the central axis of the sleeve passage, and each of which comprises a carrier which is held rotatably around a first axis of rotation parallel to the central axis of the basis, and at least one blade fixed to the carrier for cutting the sleeve, wherein each rotary cutter is rotatably mounted to one end portion of the pivoting arm so as to be pivotable about a respective pivoting axis; and
- a pivoting drive, wherein the pivoting arm engages, at its other end portion opposite to the one end portion, with the pivoting drive, which is configured to adjust the radial distances of the rotary cutters with respect to the central axis of the sleeve passage, wherein the pivoting drive comprises a ring engageable with each one of the plurality of pivoting arms such that rotation of the ring causes a change in the radial position with respect to the central axis of each one of the plurality of the pivoting arms, and thereby each one of the plurality of rotary cutters.

2. Sleeve cutting mechanism according to claim 1, wherein the rotary cutters are held on the basis so as to be movable in a common plane having a normal vector which corresponds to the central axis.

3. Sleeve cutting mechanism according to claim 1, wherein the radial distances of the rotary cutters are synchronously adjustable.

4. Sleeve cutting mechanism according to claim 1, wherein the rotary cutters are divided into at least two groups, wherein the radial distances of the rotary cutters assigned to any one of the at least two groups are adjustable synchronously and independently of the radial distances of the rotary cutters assigned to another of the at least two groups.

5. Sleeve cutting mechanism according to claim 1, further comprising a plurality of intermediate gears each held rotatably on a respective one of the plurality of pivoting arms, wherein each of the plurality of intermediate gears are rotatable about a respective second axis of rotation, wherein the second axis of rotation of each of the plurality of intermediate gears also coincides with the respective pivoting axis.

6. Sleeve cutting mechanism according to claim 5, further comprising a driven gear held on a respective one of the plurality of pivoting arms, wherein the driven gear is rotatable based on engagement with a respective one of the plurality of intermediate gears to rotate the carrier and the at least one blade fixed to the carrier for cutting the sleeve.

7. Sleeve cutting mechanism according to claim 5, comprising a ring gear meshing with the intermediate gears, wherein the ring gear is held on the basis so as to be rotatable around the central axis.

8. Sleeve cutting mechanism according to claim 7, wherein the ring gear is driven by a motor.

9. Sleeve cutting mechanism according to claim 1, wherein the pivoting drive meshes with gear means provided at the other end portion of the respective pivoting arm.

10. Sleeve cutting mechanism according to claim 9, wherein the ring of the pivoting drive comprises a ring gear that is rotatable by means of a crank handle mechanism mounted to the basis.

11. Sleeve cutting mechanism according to claim 9, wherein the gear means provided at the other end portion of the respective pivoting arm comprises a ring gear segment.

12. Sleeve cutting mechanism according to claim 11, wherein the ring gears or ring gear segments are each rotatable by means of associated crank handle mechanisms mounted to the basis.

13. Sleeve cutting mechanism according to claim 1, further comprising a ring gear, wherein the ring of the pivoting drive and the ring gear are held one on top of the other on the basis, so as to be rotatable around the central axis of the sleeve passage independently of each other.

14. Sleeve cutting mechanism according to claim 1, wherein each rotary cutter comprises a select one of a driven gear or a driven pulley non-rotatably connected to the respective carrier.

15. Sleeve cutting mechanism according to claim 14, wherein each rotary cutter comprises the driven pulley, and the driven pulley is driven by a timing belt.

16. Sleeve cutting mechanism according to claim 14, wherein the each rotary cutter comprises the driven gear, and the driven gear is driven by an intermediate gear which is held rotatably on the pivoting arm, with a second axis of rotation coinciding with the pivoting axis.

17. Method for cutting a sleeve using a sleeve cutting mechanism according to claim 1, comprising the steps:
- moving the rotary cutters with respect to the central axis of the sleeve passage to adjust radial distances of the rotary cutters depending on a cross-section of a tubular sleeve being conveyed though a sleeve passage on an mandrel, so that at least one blade fixed to a carrier when rotating around its axis of rotation can enter into the sleeve passage, and
- rotating each carrier by an angle of at least 360° divided by the number of blades.

18. A sleeve cutting apparatus for cutting a sleeve being conveyed along a central axis through a machine, the sleeve cutting apparatus comprises (a) a plurality of rotary cutters having a blade, wherein the blade is rotatable 360 degrees about a rotational axis, (b) a rotation drive that includes a select one of (i) a ring gear configured to engage with one or more gears that cause the blade to rotate 360 degrees about the rotational axis, and (ii) a timing belt configured to engage with one or more pulleys that cause the blade to rotate 360 degrees about the rotational axis, and (c) a pivoting drive configured to adjust a distance of the plurality of rotary cutters relative to the central axis, wherein the pivoting drive and the rotational drive are independently operable.

19. The sleeve cutting apparatus of claim 18, wherein the pivoting drive comprises (i) a plurality of pivoting arms each connected with one of the rotary cutters, and (ii) a ring wherein rotation of the ring changes the radial position with respect to the central axis of each one of the plurality of the pivoting arms, and thereby each one of the plurality of rotary cutters.

* * * * *